(12) United States Patent
Pierrot et al.

(10) Patent No.: US 8,074,455 B2
(45) Date of Patent: Dec. 13, 2011

(54) GAS TURBINE ENGINE WITH A MEANS OF DRIVING THE ACCESSORY GEAR BOX, AND METHOD OF FITTING SAID ENGINE

(75) Inventors: Arnaud Jean-Marie Pierrot, Le Mee sur Seine (FR); Stephane Rousselin, Hericy (FR)

(73) Assignee: Snecma, Paris (FR)

( * ) Notice: Subject to any disclaimer, the term of this patent is extended or adjusted under 35 U.S.C. 154(b) by 907 days.

(21) Appl. No.: 12/196,580

(22) Filed: Aug. 22, 2008

(65) Prior Publication Data

US 2009/0049841 A1 Feb. 26, 2009

(30) Foreign Application Priority Data

Aug. 23, 2007 (FR) ..................................... 07 05984

(51) Int. Cl.
*F02C 3/10* (2006.01)
(52) U.S. Cl. .......................... 60/792; 60/39.162; 60/802
(58) Field of Classification Search .................... 60/792, 60/39.162, 802, 786, 788, 39.163, 778
See application file for complete search history.

(56) References Cited

U.S. PATENT DOCUMENTS

| 5,103,631 | A | * | 4/1992 | Edwards et al. | 60/792 |
| 5,349,814 | A | | 9/1994 | Ciokajlo et al. | |
| 2006/0277920 | A1 | * | 12/2006 | Bart et al. | 60/793 |
| 2007/0177935 | A1 | * | 8/2007 | Galivel et al. | 403/118 |
| 2008/0072568 | A1 | * | 3/2008 | Moniz et al. | 60/226.1 |

FOREIGN PATENT DOCUMENTS

| EP | 1 574 687 A1 | 9/2005 |
| EP | 1 748 170 A2 | 1/2007 |
| EP | 1 813 792 A1 | 8/2007 |
| GB | 1 323 787 | 7/1973 |

* cited by examiner

*Primary Examiner* — William Rodriguez
*Assistant Examiner* — Nicholas Karnezos
(74) *Attorney, Agent, or Firm* — Oblon, Spivak, McClelland, Maier & Neustadt, L.L.P.

(57) ABSTRACT

A twin-spool gas turbine engine including a high-pressure rotor and a low-pressure rotor, which rotors are mounted in bearings supported by an intermediate casing, at least one accessory gear box, and a drive device which drives radial and coaxial shafts for transmitting movement to the accessory gear box is disclosed. The drive device includes a high-pressure drive gear driving one of the radial shafts and connected to the high-pressure rotor and a low-pressure drive gear connected to the low-pressure rotor upstream of the high-pressure drive gear and driving the other of the radial shafts. The low-pressure drive gear is supported in the intermediate casing by an axial-positioning bearing.

10 Claims, 4 Drawing Sheets

GAS TURBINE ENGINE WITH A MEANS OF DRIVING THE ACCESSORY GEAR BOX, AND METHOD OF FITTING SAID ENGINE

BACKGROUND OF THE INVENTION

The invention relates to a twin-spool gas turbine engine with means of driving the gears of the gear box to which the accessories are fitted.

Some of the power generated by an aeronautical gas turbine engine is used to power various accessories, both of the engine and of the aircraft for which the engine provides some of the propulsive power.

Some of this power is currently tapped off the high-pressure (HP) compressor, the compressed air from which is used, in particular, to pressurize and air-condition the cabin of the aircraft or the de-icing. Another portion of this power is tapped mechanically off the shaft of the HP stage of the engine to drive the input shaft of an accessory gear box positioned on a casing of the engine. This input shaft is rotationally driven by a radial transmission shaft running through a structural arm of the intermediate casing and itself driven by a gear secured to the HP shaft.

The accessory gear box well known to those skilled in the art by its English term and abbreviation "Accessory Gear Box (AGB)" supports various machines, or accessories, for example a generator, a starter motor, an alternator, hydraulic, fuel or oil pumps, etc. These various accessories are mechanically driven by the HP shaft, via radial transmission shafts.

There is a current trend toward increasing the amount of mechanical power tapped off because of the ever increasing role played by electrical means which are held to have greater flexibility of use.

However, tapping off excessive amounts of mechanical power has a detrimental effect on the operation of the HP spool because it is liable to cause the compressor to hunt, particularly when the engine is running at low speed.

DESCRIPTION OF THE PRIOR ART

Patent application FR2882096 discloses tapping some of the mechanical power from the low-pressure (LP) spool. With reference to FIG. 1, patent application FR2882096 describes a turbine engine with HP and LP drive gears secured respectively to the HP and LP compressor shafts, the HP and LP drive gears driving radial transmission shafts of the accessory gear box.

Fitting the radial transmission shafts with the drive gears onto the LP and HP compressor shafts entails precise adjustment. The LP drive gear is mounted securely on the LP compressor shaft with an angular transmission corresponding to the angular inclination of the radial transmission shaft with which it meshes. The axial position of the angular transmission is given by an adjusting packing piece, the dimensions of which need to be defined very accurately in order to ensure optimal transmission of power between the LP shaft and the radial shaft. This definition of the dimensions of the packing piece is difficult to obtain given the manufacturing tolerances on the various components.

Thus, if the LP drive gear is not correctly axially positioned, it is necessary to remove the radial transmission shafts, modify the angular transmission, reworking its size, and to reposition the radial transmission shafts. Fitting the turbine engine therefore entails repeating steps of positioning and of reworking the dimensions of the drive gears, thus increasing the time taken to fit the turbine engine.

Fitting in this way is all the more complicated when the drive gears are positioned in the absence of the radial transmission shafts as they then become more difficult to center.

SUMMARY OF THE INVENTION

This is why the Applicant Company has attempted to develop a new arrangement for the tapping of power from the two engine shafts with a view to alleviating these disadvantages.

Thus, the invention relates to a twin-spool gas turbine engine comprising a high-pressure rotor and a low-pressure rotor, which rotors are mounted in bearings supported by an intermediate casing, at least one accessory gear box, a drive means, driving radial and coaxial shafts for transmitting movement to the accessory gear box, the drive means comprising a high-pressure drive gear driving one of said radial shafts and connected to the high-pressure rotor, a low-pressure drive gear connected to the low-pressure rotor upstream of the high-pressure rotor and driving the other of said radial shafts, wherein the low-pressure drive gear is supported in the intermediate casing by an axial-positioning bearing.

By virtue of the invention, the low-pressure (LP) drive gear is positioned axially with respect to the radial transmission shaft in a way that circumvents the manufacturing tolerances.

The LP gear is fitted before the LP rotor is fitted while the radial transmission shaft is already in position, only lightweight components needing to be handled.

For preference, the drive means comprises two gears for driving the radial shafts, these forming a take-off module mounted in a protective box secured to the intermediate casing.

The low-pressure drive gear advantageously comprises a setting means for adjusting its axial position with a take-off gear secured to the radial transmission shaft.

Power-transmitting splines are formed on the internal face of the low-pressure drive gear, and on the external face of the shaft of the low-pressure rotor, the splines collaborating with one another to transmit the movement of the low-pressure rotor to the low-pressure gear.

As a further preference, the axial-positioning bearing is in the form of a ball bearing, the balls of which are held between an internal holding ring connected to the low-pressure drive gear and an external holding ring connected to the protective box.

Advantageously, a locking means locks the axial position of the LP drive gear with the take-off gear, a lock nut being screwed onto a screw thread formed on the external face of the low-pressure drive gear.

As a preference, the LP drive gear has a radial upstream part supporting a toothset and a cylindrical downstream part on which the axial-positioning bearing is externally fitted.

As a further preference, the toothset of the LP drive gear faces in the downstream direction.

The invention also relates to a method of fitting an engine, including the steps involving:
 fitting the high-pressure rotor;
 fitting the take-off module with the radial transmission shafts into a protective box secured to the intermediate casing of the engine, the axial-positioning bearing being secured to the protective box;
 positioning the low-pressure drive gear coaxial with and inside the axial-positioning bearing;
 setting the axial position of the low-pressure drive gear with the take-off gear;

locking the position of the low-pressure drive gear with respect to the axial-positioning bearing, the low-pressure drive gear then being supported by the axial-positioning bearing; and inserting the shaft of the low-pressure rotor while causing the power-transmitting splines of the low-pressure drive gear to collaborate with the power-transmitting splines of the shaft.

BRIEF DESCRIPTION OF THE DRAWINGS

The invention will be better understood with the aid of the following description of the preferred embodiment thereof, with reference to the attached drawing, in which.

DESCRIPTION OF THE PREFERRED EMBODIMENT

Figure 1:
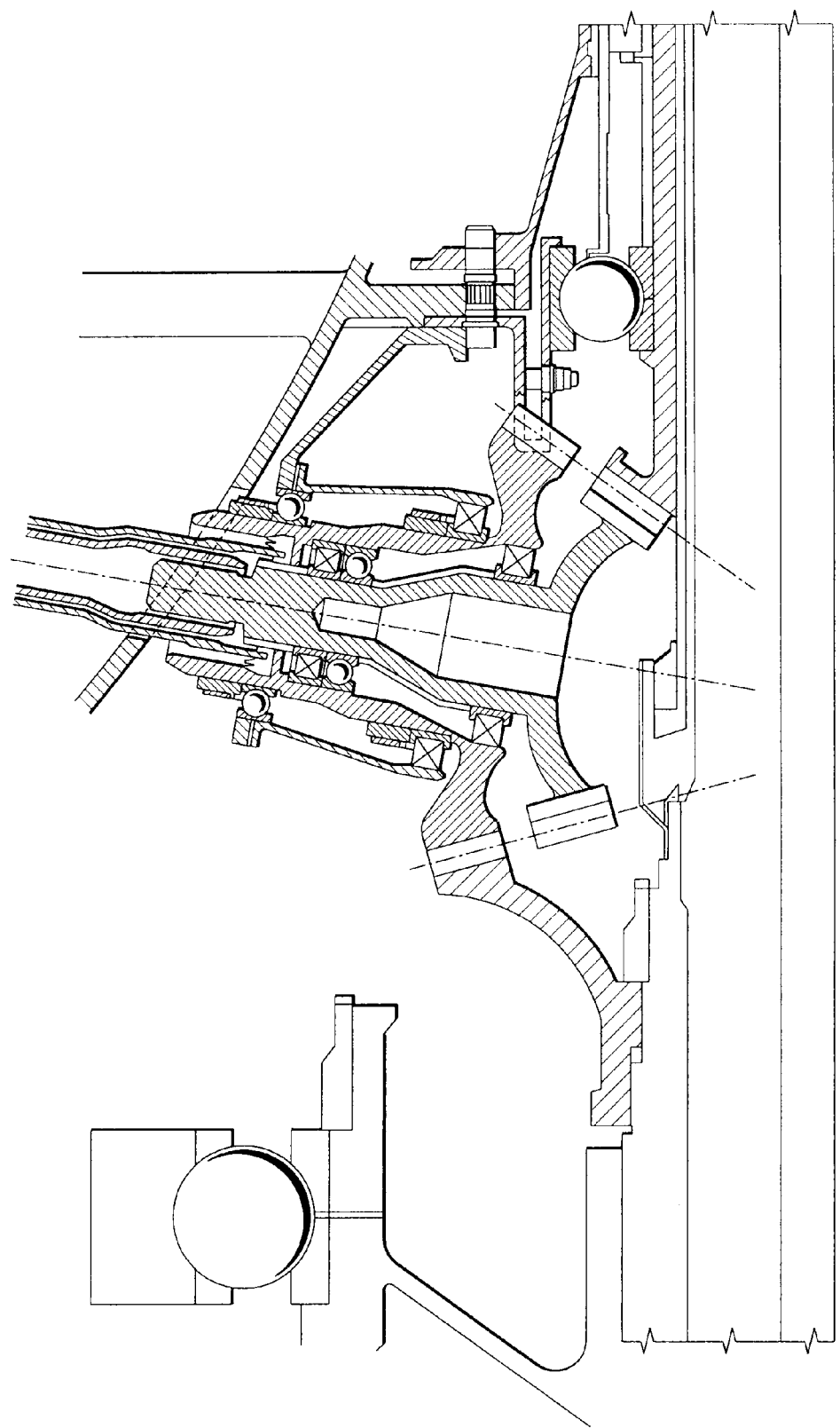
FIG. 1 depicts a sectioned view of an engine of the prior art in which an LP drive gear is secured to the shaft of the LP rotor.
Figure 2:
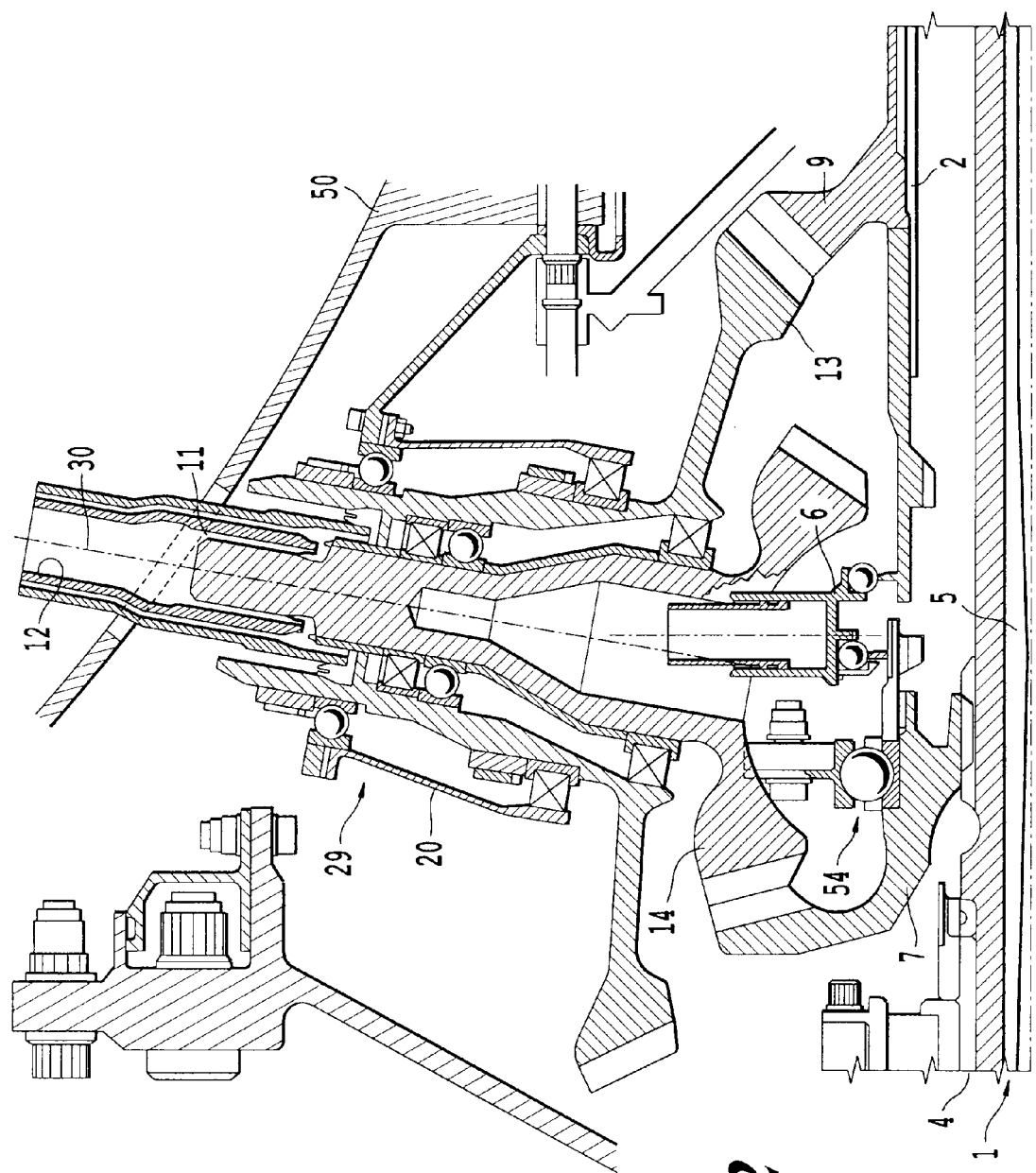
FIG. 2 depicts a sectioned view of an engine of the invention in which an LP drive gear is supported by an axial-positioning bearing.

With reference to FIG. 2, the engine of the invention is a twin spool gas turbine engine comprising a low-pressure (LP) rotor 1 and a high-pressure (HP) rotor 2, which are mounted in such a way that they can rotate about the axis 3 of the engine. This type of engine is well known to those skilled in the art. It may be a turbojet engine or a turboprop engine, for example. It can in fact be any engine comprising a compressor and a turbine, of the twin-spool type, having a low-pressure spool and a high-pressure spool. Internal/external, inside/outside will, in the description, be used to denote internal/external or inside/outside relative to the engine, radially, with respect to its axis 3.

More specifically, the engine functionally comprises, from the upstream direction downstream in the direction in which the gases flow, a fan, a compressor, a combustion chamber, a turbine and a jet pipe. As it is a twin-spool engine, it comprises an LP compressor, upstream of an HP compressor, and an HP turbine, upstream of an LP turbine. The fan rotor is secured to the shaft 4 of the LP compressor, itself secured to the shaft 5 of the LP turbine. The LP rotor 1 therefore comprises these three elements secured together. The shaft 5 of the LP turbine runs coaxially inside the HP rotor 2 formed by the HP compressor and the HP turbine secured together.

The downstream end of the shaft 4 of the LP compressor, which is secured to the shaft 5 of the LP turbine, lies just upstream of the upstream end of the HP rotor 2. The shaft 4 of the LP compressor is fixed coaxially on the outside of the shaft 5 of the LP turbine. There is a seal 6 between the downstream end of the shaft 4 of the LP compressor and the upstream end of the HP rotor 2, to provide sealing between the region situated on the outside, which is bathed in a mist of lubricating oil, and the region situated on the inside, where it is mainly air that flows.

The rotor shafts 4, 5 are supported by bearings in the intermediate casing 50 of the engine.

The shaft 4 of the LP compressor comprises, near its downstream end, a drive gear 7 that will be termed the LP drive gear 7. This LP drive gear 7 lies downstream of the downstream bearing of the shaft 4 of the LP compressor. The HP rotor 2 comprises, near its upstream end, a drive gear 9 that shall be termed the HP drive gear 9. This HP drive gear 9 lies upstream of the upstream bearing of the HP rotor 2.

Figure 3:
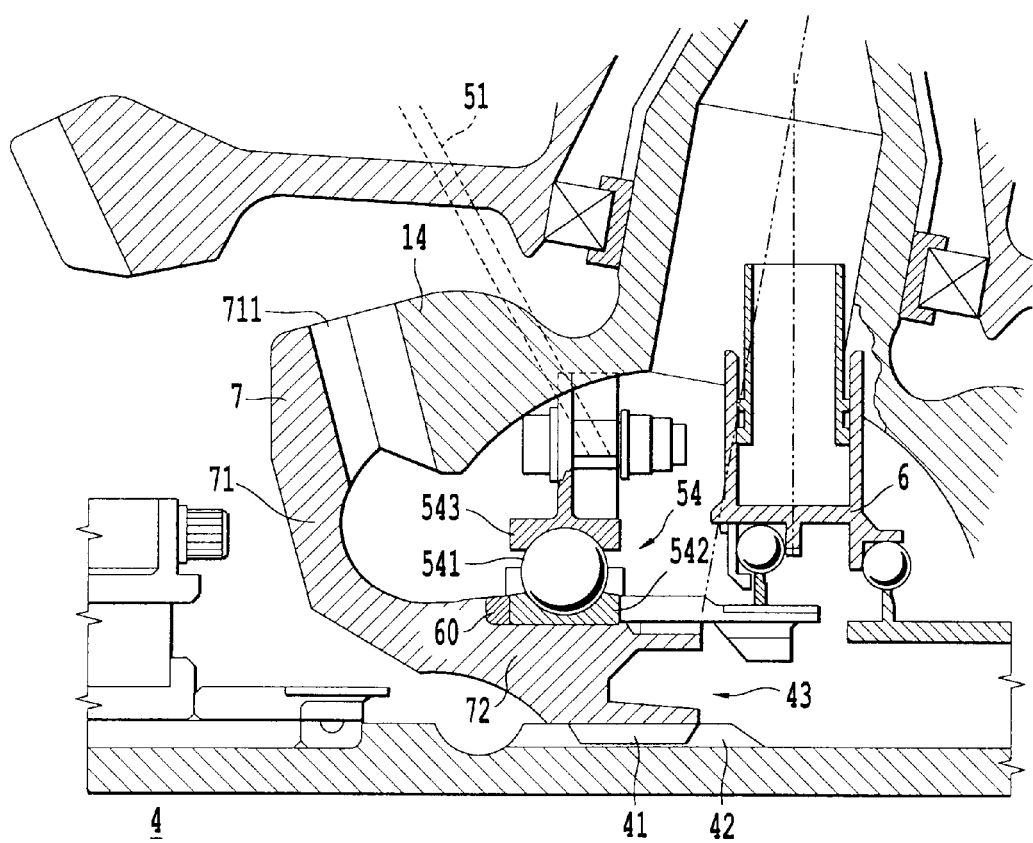
FIG. 3 depicts a close-up view of the gear of FIG. 2.
Figure 4:
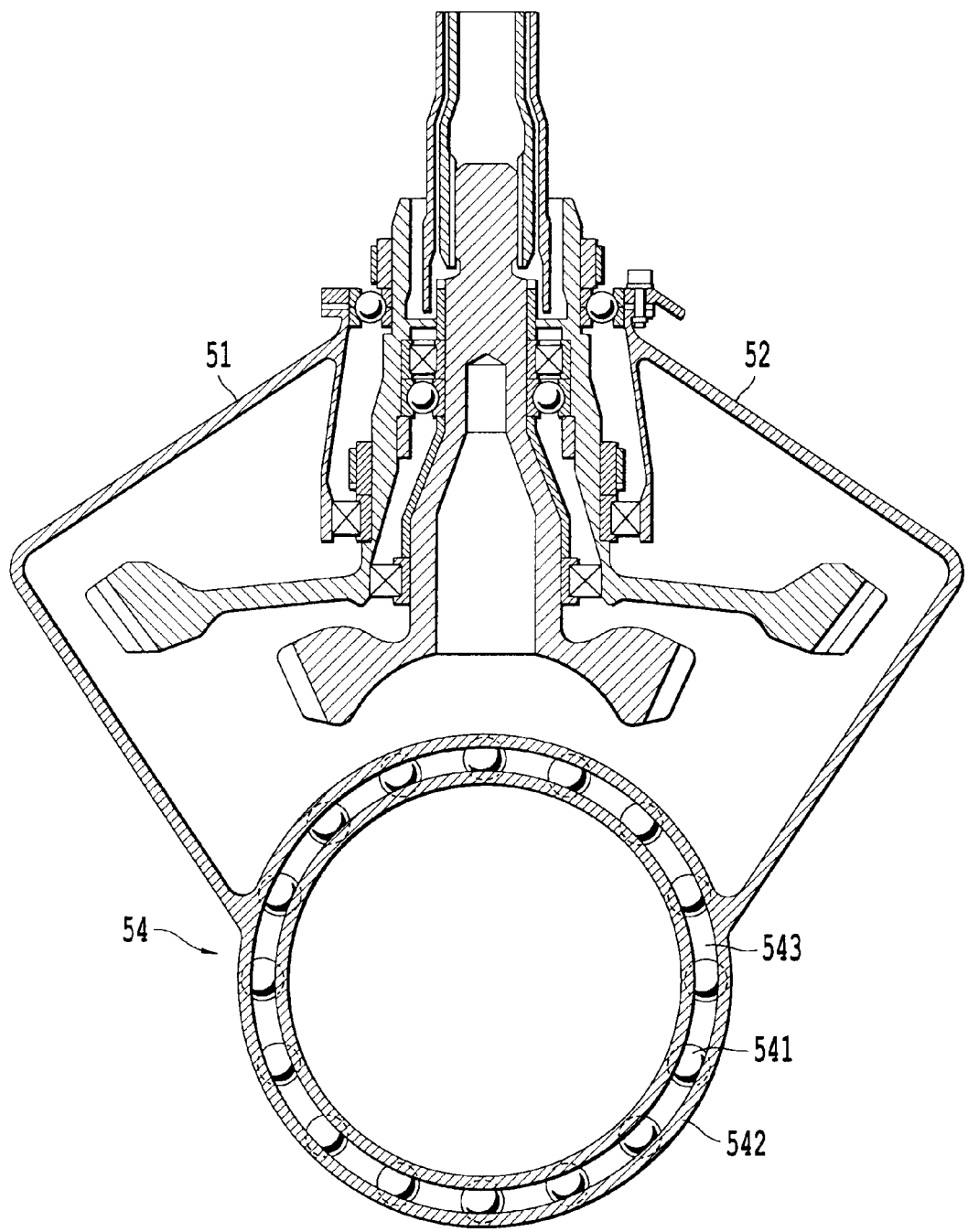
FIG. 4 depicts a view in section, along two axes, representing the axial-positioning bearing of the invention.

With reference to FIG. 3, the LP drive gear 7 is in the form of an annulus which runs coaxially on the outside of the shaft 4 of the LP compressor. The LP drive gear 7 is supported by an axial-positioning bearing 54 fixed securely to the intermediate casing 50. The axial-positioning bearing 54 is, here, in the form of a ball bearing 54 which runs coaxially on the outside of the LP drive gear 7. The ball bearing 54 is held firmly by two support arms 51, 52 of the intermediate casing 50, which are depicted in FIG. 4, the support arms 51, 52 being substantially radial.

The support arms 51, 52 are, here, of square cross section, but arms of some different cross sectional shape may also suit.

With reference to FIG. 3, the ball bearing 54 comprises a collection of balls 541 held between an internal holding ring 542 and an external holding ring 543. The external holding ring 543 is fixed, in this instance using a screw, to a flange of the support arms 51, 52, while the internal holding ring 542 is in surface contact with the external face of the LP drive gear 7. The LP drive gear 7 comprises a substantially radial upstream portion 71 on which there is formed a toothset 711 intended to correspond with a toothset of a drive gear of an auxiliary machine which will be detailed later on. The LP drive gear 7 further comprises a substantially cylindrical downstream portion 72 in contact with the internal ring of the ball bearing 54. Thus, the ball bearing 54 is fitted downstream of the toothset of the LP drive gear 7, externally and coaxially with respect to said LP drive gear 7. The drive gear may thus be inserted into the ball bearing 54 from the upstream end of the engine. The LP drive gear 7 comprises a packing piece for adjusting the relative axial position of the LP drive gear 7 with respect to the ball bearing 54. The packing piece is in the form of packing rings 60 of different longitudinal thicknesses, the diameters of which are substantially equal to the diameter of the ball bearing 54. A packing ring 60 such as this is slipped axially between the cylindrical downstream part of the LP drive gear 7 and the ball bearing 54 so as to compensate for any manufacturing tolerances on the drive gears 7, 14.

The cylindrical downstream part of the drive gear is thus supported by the axial-positioning bearing 54, there being nothing holding the gear in position prior to the insertion of the LP shaft. The bearing 54 supports and axially positions the gear 7 via a packing ring 60 which is slipped axially onto the cylindrical downstream part of the gear 7.

Power-transmitting splines 41 are formed on the internal face of low-pressure drive gear 7, the splines 41 being directed axially so as to collaborate with axial power-transmitting splines 42 formed on the external face of the shaft 4 of the low-pressure rotor 1.

The two sets of splines 41, 42 collaborate in order to allow the LP drive gear 7 to move only axially with respect to the shaft 4 of the LP compressor, thus making it easier to position in the axial direction.

With reference to FIG. 3, the LP drive gear 7 and the shaft 4 of the LP compressor are fixed by an axial lock nut 43 which screws onto a screw thread formed on the external face of the LP drive gear 7. Tightening the nut 43 holds the LP drive gear 7, the packing ring 60 and the ball bearing 54 firmly in position.

With reference to FIG. 2, the engine comprises a radial shaft 11 for transmitting the movement from the LP shaft, and which will be termed the LP radial transmission shaft 11, and the radial shaft 12 for transmitting the movement from the HP shaft, and that will be termed the HP radial transmission shaft 12.

The LP and HP radial transmission shafts 11 and 12 respectively are rotated by a drive means forming a take-off module 29 on the LP and HP drive gears 7 and 9 respectively.

The HP radial transmission shaft 12 is connected and secured, at its internal end, to a take-off gear 13 of the module 29, that will be termed the HP take-off gear 13, designed to mesh with the HP drive gear 9. The LP radial transmission shaft 11 is connected and secured, at its internal end, to a take-off gear 14 of the module 29, and that will be termed the LP take-off gear 14, designed to mesh with the LP drive gear 7. The LP take-off gear 14 is coaxial with the HP take-off gear 13, of a larger diameter than the latter, and situated on the external side thereof.

Fitted between the radial transmission shafts 12 and 11 is a set of bearings that allow the radial shafts 12, 11 to rotate relative to one another, either in the same direction or in opposite directions according to the way in which the HP and LP rotors 2 and 1 respectively rotate.

The radial transmission shafts 12, 11 are held in a box 20 of the take-off module 29 of the engine that is secured to the intermediate casing 50 and will be termed the box 20. This box 20 is of tubular shape and runs coaxially with respect to the HP and LP radial transmission shafts 12 and 11 respectively.

The way in which the LP drive gear 7 is fitted and positioned will now be explained in greater detail.

During the fitting of the engine, the HP rotor 2 is fitted first of all. The box 20 of the take-off module 29 is then fitted. In other words, the take-off module 29 is preassembled and then directly fitted "as is" to the engine. The box 20 is fixed to the flange of the fixed structure of the engine, the box therefore being secured to the intermediate casing 50. When the module 29 is fitted, the HP take-off gear 13 of the HP radial transmission shaft 12 comes into mesh with the HP drive gear 9 of the HP rotor 2.

The radial transmission shafts 11, 12 are then posted into a radial arm of the engine. The radial transmission shafts 11, 12 run through an arm of the intermediate casing, which is a structural casing, forming part of the fixed structure of the turbojet engine, the external envelope of which runs as a continuation of the fan casing, and to which are generally attached the pylons used to secure the turbojet to the aircraft it is intended to power.

The next step is to fix the ball bearing 54 with the protective box 20 which therefore becomes secured to the intermediate casing 50 of the engine. The balls 541 of the bearing 54 are held between the internal holding ring 542 and the external holding ring 543 which is connected to the protective box 20 via the support arms 51, 52.

A low-pressure drive gear 7 is positioned coaxial to and on the inside of the bearing 54, thus allowing it axial translational movement.

In a play-estimating step, the dimensions of the packing piece between the low-pressure drive gear 7 and the drive gear 14 of the radial transmission shaft 11 are estimated.

The low-pressure drive gear 7 is removed and a packing ring 60 of a suitable thickness is slipped axially around the outside of the gear 7 then the low-pressure drive gear 7 is re-fitted coaxial to and on the inside of the rolling bearing 54.

The position of the low-pressure drive gear 7 with respect to the rolling bearing 54 is locked by tightening the lock nut 43 onto a screw thread formed in the external face of the low-pressure drive gear 7 now supported by the rolling bearing 54.

The shaft 4 of the low-pressure rotor is introduced via the rear of the engine while causing the power-transmitting splines 41 of the low-pressure drive gear 7 to collaborate with the power-transmitting splines 42 of the low-pressure rotor 1.

This then avoids the iterative steps of positioning and sizing the LP drive gear 7.

The take-off module 29, the LP and HP rotors 1 and 2 respectively, and the LP and HP radial transmission shafts 11 and 12 respectively, are thus fitted relative to one another with the means of driving the radial transmission shafts 11, 12 correctly in place.

During engine operation, the LP and HP rotors 1 and 2 respectively rotate, in the same direction or in different directions depending on the way in which the engine rotates, the power-transmitting splines 42 of the shaft 4 of the LP rotor 1 collaborating with the power-transmitting splines 41 of the low-pressure drive gear 7 which rotates and meshes with the LP take-off gear 14 secured to the LP radial transmission shaft 11. The internal holding ring 542 of the rolling bearing 54 turns while the external holding ring 543 remains stationary.

The LP and HP drive gears 7 and 9 respectively rotationally drive the respective LP and HP take-off gears 14 and 13 of the take-off module 29, which take-off gears rotationally drive the LP and HP radial transmission shafts 11 and 12 respectively.

The radial transmission shafts 11, 12 are, at their external end, connected to one or more accessory gear boxes. Thus, each radial transmission shaft 11, 12 can drive a different accessory gear box or, alternatively, the shafts 11, 12 are coupled so that they drive one and the same accessory gear box. To do this, the shafts 11, 12 may, for example, drive the inputs of a differential gear set, the output of which is connected to the accessory gearbox drive shaft in a way well known to those skilled in the art.

It may be noted that, in the embodiment of the figure, the axis 30 of the radial transmission shafts 11, 12 does not make a right angle with the axis 3 of the engine. The drive gears 7, 9 of the rotors 1, 2 and the take-off gears 14, 13 of the take-off module 29 are structurally designed accordingly. Depending on the particular embodiment chosen, these gears may be straight-cut spur gears, bevel gears, or some other kind of gear designed by the person skilled in the art to ensure correct take-off.

The invention claimed is:

1. A twin-spool gas turbine engine comprising:
    a high-pressure rotor and a low-pressure rotor, which rotors are mounted in bearings supported by an intermediate casing;
    at least one accessory gear box; and
    a drive device which drives first and second radial shafts which are coaxial for transmitting movement to the accessory gear box, the drive device including a high-pressure drive gear which drives the first radial shaft and is connected to the high-pressure rotor, and a low-pressure drive gear which drives the second radial shaft and is connected to the low-pressure rotor upstream of the high-pressure drive gear,
    wherein the low-pressure drive gear includes a substantially radial upstream portion with a toothset formed on a downstream side of the radial upstream portion, a substantially cylindrical downstream portion which is supported in the intermediate casing by an axial-positioning bearing and a transition portion between the radial upstream portion and the cylindrical downstream portion, an inner side of the transition portion is continuous with the downstream side of the radial upstream portion and an outer circumferential surface of the cylindrical downstream portion and an outer side of the transition portion is continuous with an upstream side of the radial upstream portion and an inner circumferential surface of the cylindrical downstream portion, and
    wherein the outer circumferential surface of the cylindrical downstream portion of the low-pressure drive gear abuts the axial-positioning bearing.

2. The twin-spool gas turbine engine as claimed in claim 1, wherein the drive device includes first and second driven gears for driving the radial shafts, the driven gears forming a take-off module mounted in a protective box secured to the intermediate casing.

3. The twin-spool gas turbine engine as claimed in claim 1, wherein the low-pressure drive gear comprises a setting device which sets the low-pressure drive gear with respect to the axial-positioning bearing so as to be able to adjust the axial position of the low-pressure drive gear with a take-off gear secured to the second radial shaft.

4. The twin-spool gas turbine engine as claimed in claim 1, wherein power-transmitting splines are formed on an internal face of the low-pressure drive gear.

5. The twin-spool gas turbine engine as claimed in claim 4, wherein power-transmitting splines are formed on an external face of a shaft of the low-pressure rotor and collaborate with the power-transmitting splines of the low-pressure drive gear.

6. The twin-spool gas turbine engine as claimed in claim 2, wherein the axial-positioning bearing is in the form of a ball bearing, the balls of which are held between an internal holding ring connected to the low-pressure drive gear and an external holding ring connected to the protective box.

7. The twin-spool gas turbine engine as claimed in claim 3, wherein a locking device locks the axial position of the low-pressure drive gear with the take-off gear.

8. The twin-spool gas turbine engine as claimed in claim 7, wherein the locking device is a lock nut screwed onto a locking screw thread formed on an external face of the low-pressure drive gear.

9. A method of fitting a twin-spool gas turbine engine comprising:
   fitting a high-pressure rotor;
   fitting a take-off module with first and second radial transmission shafts into a protective box secured to an intermediate casing of the gas turbine engine;
   securing an axial-positioning bearing to the protective box;
   positioning a low-pressure drive gear coaxial with and inside the axial-positioning bearing;
   setting an axial position of the low-pressure drive gear with a take-off gear;
   locking the position of the low-pressure drive gear with respect to the axial-positioning bearing, the low-pressure drive gear then being supported by the axial-positioning bearing; and
   inserting a shaft of a low-pressure rotor while causing power-transmitting splines of the low-pressure drive gear to collaborate with power-transmitting splines of the shaft,
   wherein the low-pressure drive gear includes a substantially radial upstream portion with a toothset formed on a downstream side of the radial upstream portion, a substantially cylindrical downstream portion which is supported in the intermediate casing by the axial-positioning bearing and a transition portion between the radial upstream portion and the cylindrical downstream portion, an inner side of the transition portion is continuous with the downstream side of the radial upstream portion and an outer circumferential surface of the cylindrical downstream portion and an outer side of the transition portion is continuous with an upstream side of the radial upstream portion and an inner circumferential surface of the cylindrical downstream portion.

10. The twin-spool gas turbine engine as claimed in claim 3, wherein the setting device includes a packing ring axially sandwiched between the axial-positioning bearing and a shoulder on the cylindrical downstream portion of the low-pressure drive gear.

* * * * *